United States Patent
Jangi (10) Patent No.: US 9,775,044 B2
(45) Date of Patent: Sep. 26, 2017

(54) SYSTEMS AND METHODS FOR USE IN AUTHENTICATING INDIVIDUALS, IN CONNECTION WITH PROVIDING ACCESS TO THE INDIVIDUALS

(71) Applicant: MASTERCARD INTERNATIONAL INCORPORATED, Purchase, NY (US)

(72) Inventor: Arvind Jangi, Chesterfield, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 15/205,664

(22) Filed: Jul. 8, 2016

(65) Prior Publication Data

US 2017/0013462 A1 Jan. 12, 2017

Related U.S. Application Data

(60) Provisional application No. 62/190,284, filed on Jul. 9, 2015.

(51) Int. Cl.
*H04M 3/16* (2006.01)
*H04W 12/08* (2009.01)
(Continued)

(52) U.S. Cl.
CPC .............. *H04W 12/08* (2013.01); *G07C 9/00* (2013.01); *H04L 63/0853* (2013.01);
(Continued)

(58) Field of Classification Search
USPC ..................................... 455/411; 705/67, 26
See application file for complete search history.

(56) References Cited

U.S. PATENT DOCUMENTS 9,391,988 B2 * 7/2016 Cronin ................ H04L 63/0861
2004/0172541 A1 9/2004 Ando et al.
(Continued)

FOREIGN PATENT DOCUMENTS

JP 2000-029840 1/2000
WO WO 2006094048 A2 * 9/2006 ......... G06K 9/00013
(Continued)

*Primary Examiner* — David Q Nguyen
(74) *Attorney, Agent, or Firm* — Harness, Dickey & Pierce, P.L.C.

(57) ABSTRACT

Systems, devices and methods are directed toward authenticating users to provide access to the users. A portable communication device, suitable for use in authenticating a user, includes a memory including a reference biometric for a user, a biometric reader, and a processor coupled to the memory and biometric reader. The processor is configured to, among other operations, compare a biometric of the user, as captured at the biometric reader, to the reference biometric stored in the memory. When the captured biometric matches the reference biometric, the processor is configured to authenticate the user and transmit an authentication signal to thereby provide access to the user. In various aspects, the authentication signal includes an identifier associated with the user, whereby other devices are able to recognize the user and authenticate the user based on the authentication signal, generally, without the user being separately authenticated at the other devices.

20 Claims, 5 Drawing Sheets

(51) Int. Cl.
*H04L 29/06* (2006.01)
*H04W 12/06* (2009.01)
*H04W 4/06* (2009.01)
*H04W 4/00* (2009.01)
*G07C 9/00* (2006.01)

(52) U.S. Cl.
CPC ......... *H04L 63/0861* (2013.01); *H04W 4/001* (2013.01); *H04W 4/008* (2013.01); *H04W 4/06* (2013.01); *H04W 12/06* (2013.01)

(56) References Cited

U.S. PATENT DOCUMENTS

| | | |
|---|---|---|
| 2006/0176146 A1 | 8/2006 | Krishan et al. |
| 2015/0113616 A1* | 4/2015 | Sampas ................ G06Q 20/206 726/6 |
| 2015/0121510 A1* | 4/2015 | Gauteron ................ G06F 21/31 726/19 |
| 2016/0224776 A1* | 8/2016 | Leow ...................... G06F 21/34 |

FOREIGN PATENT DOCUMENTS

| | | |
|---|---|---|
| WO | WO2008/147457 | 12/2008 |
| WO | WO2009/042392 | 4/2009 |
| WO | WO2011/028874 | 3/2011 |

* cited by examiner

SYSTEMS AND METHODS FOR USE IN AUTHENTICATING INDIVIDUALS, IN CONNECTION WITH PROVIDING ACCESS TO THE INDIVIDUALS

CROSS-REFERENCE TO RELATED APPLICATION

This application claims the benefit of, and priority to, U.S. Provisional Application No. 62/190,284 filed on Jul. 9, 2015. The entire disclosure of the above application is incorporated herein by reference.

FIELD

The present disclosure generally relates to systems and methods for use in authenticating individuals (e.g., confirming identities of individuals, etc.), using biometric data for the individuals, in connection with providing access to the individuals, for example, to computing devices, program applications, secure locations, secure documents (broadly, secure items), etc.

BACKGROUND

This section provides background information related to the present disclosure which is not necessarily prior art.

For security reasons, access to various computing devices (including applications available via the computing devices) and/or to various locations is often limited or restricted to particular individuals. That is, to gain access to the computing devices, for example, the individuals must have permission to access the computing devices. It is further known that, to gain access, the individuals must present proper credentials (e.g., proper usernames, passwords, passcodes, pins, tokens, biometrics, combinations thereof, etc.) directly at the computing devices (or applications) or directly at the secure locations to authenticate the individuals. Such computing devices, applications and locations, which require the individuals to have permission and access credentials, are generally referred to as secured.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Individuals often request access (e.g., login access, entry access, etc.) to various secure devices, program applications, locations, and/or documents, etc. (broadly, secure items). However, for security reasons, such access is often limited to particular or preselected individuals. As such, in order to gain the desired access, the individuals typically must verify their identities or authenticate themselves (e.g., provide proper credentials such as usernames, passwords, passcodes, pins, combinations thereof, etc.) to the devices, program applications, locations, documents, etc. Uniquely, the systems, devices and methods herein can be used to authenticate individuals, in connection with their requests to access one or more of such devices, program applications, locations, documents, etc., and then to transmit authentication signals to other devices, program applications, locations, etc., to which the individuals have permission and/or are within the general vicinity of the authenticated individuals. In this manner, authentication of an individual at one device (e.g., via a biometric, etc.) (which may include one, two, three or more factor authentication) may be disseminated to other devices, such that repeated, separate authentication of the individual at the other devices may be limited, reduced or eliminated.

Figure 1:
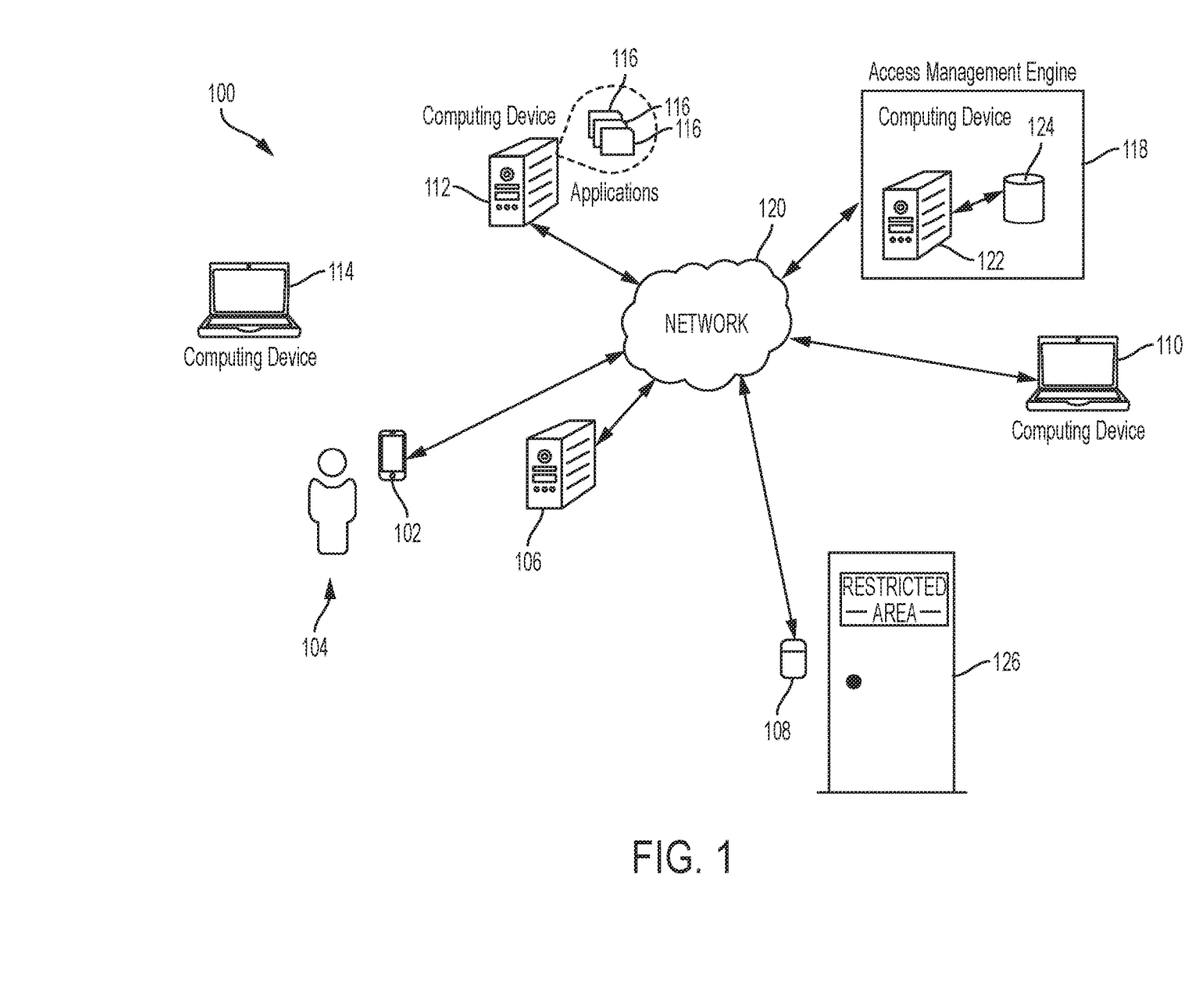
FIG. 1 is a block diagram of an exemplary system of the present disclosure suitable for use in authenticating individuals in connection with providing or denying requested access to the individuals, for example, to computing devices, program applications, secure locations, secure documents, etc.

FIG. 1 illustrates an exemplary system 100, in which one or more aspects of the present disclosure may be implemented. The system 100 is suitable for use in authenticating individuals (e.g., confirming their identifies, etc.) using at least biometric data, prior to granting access (e.g., login access, entry access, etc.) to the individuals to one or more computing devices, program applications, secure locations, secure documents, etc. (broadly, secure items). Although components of the system 100 are presented in one arrangement, it should be appreciated that other exemplary embodiments may include the same or different components arranged otherwise, for example, depending on desired access to various components, interactions and/or relationships between the various components, manners of compiling and processing data (including biometric data), manners of authorizing and/or granting requested access to individuals, etc.

The illustrated system 100 generally includes a portable communication device 102 associated with individual 104, a plurality of computing devices 106-114, and a plurality of program applications 116 (e.g., associated with various websites that provide user services or accounts, etc.) accessible via computing device 112, for example. Each of the computing devices 106-114 and each of the program applications 116 require appropriate permission and authentication for access (e.g., appropriate login or entry credentials, etc.) (i.e., each is a secured device and/or application). In connection therewith, in the system 100, the individual 104 has been given permission or is authorized (e.g., has previously been verified, has previously established credentials, etc.) to access each of the computing devices 106-114 and program applications 116 in FIG. 1.

Generally in the system 100, the individual 104 is able to use the portable communication device 102 to gain access, when desired, to each of the illustrated computing devices 106-114 and program applications 116 (broadly, to initiate an access request). For example, and as will be described more hereinafter, a reference biometric from the individual 104 is stored on the portable communication device 102 (e.g., at the time the individual 104 is originally verified, at the time the individual 104 previously established access credentials, at a different time, etc.). To gain access to the computing devices 106-114 and/or program applications 116, the individual 104 provides a sample biometric to the portable communication device 102 (or other suitable computing devices). The portable communication device 102 is configured, in turn, to capture the biometric from the individual 104 and compare it to the reference biometric. When the sample biometric matches the reference biometric, the individual 104 is authenticated at the portable communication device 102. The portable communication device 102 may further be configured to request and/or receive a second, third or additional form of authentication (e.g., a username, a PIN, a password, etc.), thereby providing multi-factor authentication of the individual 104, at the portable communication device 102. In at least one embodiment, possession of the individual-specific portable communication device 102 (e.g., possession by the individual 104 of a smartphone issued and/or specific to the individual 104, etc.) may serve as the additional form of authentication in a multi-factor authentication scheme (in addition to the biometric authentication, for example).

In turn, the portable communication device 102 (or other suitable computing devices) is configured, via an application and/or an engine (as described below, for example), to transmit a corresponding authentication signal to the computing devices 106-114 and/or the program applications 116 (providing various data, credentials, etc., identifying the individual 104) (directly or indirectly). Upon receipt of the authentication signal, each of the computing devices 106-114 and/or the applications 116 is configured to grant access, as appropriate. It should be appreciated that any desired biometric data may be used in the system 100, in connection with authenticating the individual 104 at the portable communication device 102 (or other suitable computing devices). For example, the biometric data may include, without limitation, fingerprint data, retina and/or iris data, voice data, data relating to facial and/or hand features, odor and/or scent data, etc.

The access available to the individual 104 in the system 100, when the individual 104 is authenticated at the portable communication device 102, may be unlimited by geographic position of the other computing devices 106-114 and applications 116 relative to the communication device 102. Nonetheless, however, in some embodiments, the access is limited to the computing devices 106-114 (and program applications 116) within a general vicinity of the portable communication device 102. As such, when access is desired by the individual 104 to a particular one of the computing devices 106-114 (and/or program applications 116), the portable communication device 102 is either positioned (e.g., by the individual 104, etc.) near the particular one of the computing devices 106-114 (and/or program applications 116) to be accessed (e.g., within 250 feet, within 35 feet, within five feet, within five inches, etc.), or is configured to be physically connected to the particular one of the computing devices 106-114 (e.g., via a USB port, etc.). Then, when the individual 104 is authenticated at the portable communication device 102, the portable communication device 102 is configured, in turn, to transmit the authentication signal to the other devices 106-114 or applications 116. The authentication signal may include, for example, an identifier (e.g., an authentication code) associated with the individual 104 (e.g., data identifying the individual 104 (e.g., a username for the individual 104 for one or more of the computing devices 106-114 or the applications 116, etc.), etc.), confirming identify of the individual 104, etc. Access may be granted, then, when appropriate or available (e.g., within the vicinity of the portable communication device 102, where permission for access has been given, etc.), at the particular one of the computing devices 106-114 and/or applications 116 upon receiving the signal.

In some embodiments, the portable communication device 102 may be provided with short-range communication technology (e.g., near field communication (NFC) technology, Bluetooth® technology, etc.) through which the portable communication device 102 is configured to communicate with (e.g., to transmit authorization signals to, etc.) the computing devices 106-114 and program applications 116 in the system 100 (e.g., when the portable communication device 102 is a cellular phone (see, e.g., FIG. 1, etc.), etc.). As such, when the individual 104 is authenticated at the portable communication device 102, any resulting access can be provided, via the portable communication device 102, to various ones of the computing devices 106-114 (and program applications 116) within the available broadcast range of the portable communication device 102. Such broadcast range of the portable communication device 102 may extend, for example, anywhere from a point of contact with (or within a few inches of) one of the computing devices 106-114, up to several hundred feet away from the computing devices 106-114 (e.g., depending on the type of short-range communication technology employed and/or the associated transmitter, etc.).

In order to use the short-range communication technology, in various embodiments, the portable communication device 102 may be configured to be paired with each of the multiple computing devices 106-114 and the applications 116, so that the portable communication device 102 and the computing devices 106-114 and/or applications 116 are able to communicate when in range (i.e., so that the portable communication device 102 is configured to transmit a signal, for example, the authorization signal, to the computing devices 106-114 and/or applications 116, and so that the computing devices 106-114 are configured to receive the signal from the portable communication device 102, etc.). This may be done automatically, for example, when the computing devices 106-114 (and program applications 116) are within the available range of the portable communication device 102. Or, this may require manual configuration of the portable communication device 102 (via one or more user commands, etc.) to identify the particular computing devices 106-114 (and program applications 116) to which access, by the individual 104 or others, is desired in response to authentication of the individual 104 at the portable communication device 102 (e.g., by receiving, retrieving, entering, etc., an identifier for the computing devices 106-114 and/or applications 116 at the portable communication device 102 when in range, etc.) and/or to identify the individual 104 to the particular one(s) of the computing devices 106-114 and/or applications 116, etc. Additionally, or alternatively, in at least one embodiment, the portable communication device 102 may be configured to transmit one or more authentication signals or other signals through an intermediary (e.g., an access management engine 118, as described below, or other engine and/or computing device; etc.) to the computing devices 106-114 and/or the applications 116, thereby reducing and/or eliminating a requirement of proximity between the portable communication device 102 and the computing devices 106-114 and/or the applications 116.

In a variety of embodiments, the portable communication device 102 may be further, or alternatively, physically connected to a particular one or ones of the computing devices 106-114, in order to communicate with (e.g., transmit authorization signals to, etc.) the particular computing device via the connection (e.g., when the portable communication device 102 is plugged into a USB drive (see, e.g., FIG. 5, etc.), etc.). As such, in these embodiments, when the individual 104 is authenticated at the portable communication device 102, the portable communication device 102 is configured to provide access to the particular one or ones of the computing devices 106-114 (and/or program applications 116, secured locations, secured documents, if present) to the individual 104 and/or others.

With continued reference to FIG. 1, the system 100 includes the access management engine 118 coupled to (and in communication with) the computing devices 106-112 and the program applications 116 (and/or secured locations, secured documents, if present), for example, via network 120. The network 120 may include, without limitation, a wired and/or wireless network, one or more local area network (LAN), wide area network (WAN) (e.g., the Internet, etc.), mobile networks, other networks as described herein, and/or other suitable public and/or private networks capable of supporting communication between the access management engine 118 and one or more of the computing devices 106-112 and program applications 116. In one example, the network 120 includes multiple networks each coupled to (and in communication with) the access management engine 118, where different ones of the multiple networks are then accessible to different ones of the computing devices 106-112 and program applications 116 in FIG. 1.

In the illustrated system 100, the access management engine 118 includes computing device 122, and is configured, often by computer executable instructions, to control access to the computing devices 106-112 and to the program applications 116 coupled to the network 120 (and potentially also to the portable communication device 102, etc.). However, it should be appreciated that this arrangement, and use of the access management engine 118, is not required for interaction (and communication) with the portable communication device 102 in the system 100. For example, computing device 114 in the system 100 is not coupled to the network 120 (and is not associated with the access management engine 118), but is able to still be accessed by the individual 104 as described herein through use of the portable communication device 102, when the individual 104 has been authenticated, as described herein. As such, it should be appreciated that the computing device 114, itself, and/or the portable communication device 102 (or other computing devices 106-112) may perform various similar operations to those performed by the access management engine 118 in controlling access to the computing device 114 or other computing devices 106-112 (or applications 116), as described next. Specifically, in numerous embodiments, operations of the access management engine 118 may be performed and/or incorporated into each (or some) of the portable communication device 102, the computing devices 106-114 and/or the application 116, which cooperate (in combination with and/or in the absence of the computing device 122) to perform as described herein.

In operation, in the system 100, the access management engine 118 is configured to initially authorize, or grant authorization to, the individual 104 to access the various computing devices 106-112 and program applications 116 coupled to (and in communication with) the network 120 as appropriate (e.g., as part of a new registration process for the individual 104 where the individual 104 is a new employee or a new member or customer of a service provider, etc.). For example, the access management engine 118 may be configured to verify, to different extents, an identity of the individual 104 to confirm that the individual 104 is who he/she says he/she is, etc. Once verified, the access management engine 118 may be configured to associate credentials with the individual 104 for each of the computing devices 106-112 and program applications 116 coupled (and in communication with) to the network 120 (e.g., credentials assigned to the individual 104, credentials selected by the individual 104, etc.). The credentials then allow the individual 104 to access the various computing devices 106-112 and program applications 116, as desired. The credentials may be the same for each of the computing devices 106-112 and program applications 116 in the system 100, or they may be different.

In addition, the access management engine 118 is configured to also generate a user profile for the individual 104, which is stored in association with the individual 104 in data structure 124, so that future actions (e.g., future access requests, future transmissions of authorization signals, etc.) involving the portable communication device 102 may be correlated to the individual 104 and the individual's user profile, as appropriate. The user profile includes various data relating to the individual 104, as well as to the accesses available for the individual 104 to the computing devices 106-112 and program applications 116 in the system 100. For example, the user profile may include a name of the individual 104, various preferences for the individual 104 relating to his/her access (e.g., a preference to show the individual's credentials at login, a preference to hide the individual's credentials at login, individual-selected ones of the computing devices 106-112 and/or applications 116 to which to send authentication signals upon authentication (or not), etc.) and/or relating to operation of the computing devices 106-112 and/or program applications 116 once access is gained, particular ones of the computing devices 106-112 and/or applications 116 to which the individual 104 has permission, particular access credentials assigned to or created by the individual 104 for each of the different computing devices 106-112 and program applications 116 in the system 100, types or levels of access available to the individual 104 for the different computing devices 106-112 and/or program applications 116 in the system 100, etc. It should be appreciated that user profiles may be different between different individuals. For example, individual 104 may have permission to access computing devices 106-112, while a different individual may only be granted permission to access the computing devices 108 and 112 and applications 116. The user profile may further include limitations on permission (e.g., accessible only during business hours, etc.) per individual and/or per computing device (or application), etc.

Further, the access management engine 118 is configured to permit (or deny) and/or to manage access to the computing devices 106-112 and program applications 116 by the individual 104 (and by other individuals), once initially authorized (e.g., the access management engine 118 may operate as a gatekeeper for access to the computing devices 106-112 and program applications 116, etc.). In connection therewith, the access management engine 118 generally is configured to approve or deny requested access to the computing devices 106-112 and program applications 116, upon receipt of the authentication signal at various ones of the computing devices 106-112. For example, after authentication of the individual 104 (based on a comparison of at least biometric data), the portable communication device 102 (when in the vicinity of the computing device 106) is configured to transmit an authorization signal, which, for example, includes an indicator of the individual 104 to the access management engine 118 (or directly to the computing device 106). Upon receipt of the signal by the computing device 106, the access management engine 118 is configured to use the indicator to identify the individual 104 in the data structure 124 and, when permitted, for the computing device 106 (e.g., when the individual's user profile indicates that the individual 104 has permission to access the computing device 106, etc.), is configured to then determine (and grant) the appropriate access for the individual 104 when the authentication signal indicates authentication of the individual 104.

In this exemplary embodiment, the individual 104 has permission to access all of the computing devices 106-114 and program applications 116 shown in FIG. 1. It should be appreciated that, in other embodiments, another individual may have permission to access only some of the computing devices (or applications) coupled to network 120 in FIG. 1 and not others. The permission may be indicated by an administrator (not shown) of the computing devices 106-112 (and/or applications 116), or similarly, may be based on selection by the individual. For example, the use profile for an individual may indicate some computing devices (or applications) being "selected" for access, while other are not. As such, in these embodiments, when an individual is authenticated at the portable communication device 102, and the portable communication device 102 transmits the authentication signal, the access management engine 118 is configured to grant or deny access to the individual based on the permission and/or select computing device(s) in the user profile for the individual. More specifically, when the individual is not permitted to access a computing device, the access management engine 118 is configured to deny access to the computing device even when the authentication signal from the portable communication device 102 is received thereby.

It should also be appreciated that the authentication signal may include any information needed to permit the individual 104 to access one or more of computing devices 106-114, upon authentication of the individual 104 at the portable communication device 102. For example, the authentication signal may simply include an identification of the individual 104 (e.g., a name of the individual, etc.) and/or an authentication code, which the computing devices 106-114 (or the access management engine 118, as appropriate) then use to grant access, for example, to identify appropriate access credentials for the individual 104 necessary to provide the desired access. Or, the authentication signal may include the individual's access credentials, which may be encrypted and/or secured according to a variety of methods, or not.

In the system 100, the portable communication device 102 is illustrated in FIG. 1 as a cellular phone (broadly, a smartphone). However, the portable communication device 102 may include (or be) other suitable devices in other embodiments, for example, a personal digital assistant (PDA), a USB drive (see, e.g., FIG. 5, etc.), a tablet, etc. In addition, the various computing devices 106-114 are illustrated as laptop computers 110, 114, an entry door access unit 108 for door 126, a server computing device 106, and computing device 112 supporting (or displaying) the multiple program applications 116. However, the system 100 may similarly include (or support) other computing devices, such as, for example, workstations, other personal computers, tablets, media devices, rooms/spaces/facilities (e.g., via entry devices, etc.), etc., and/or other electronic devices, and/or other program applications, each of which also requires appropriate authorization for access.

Depending on the computing device, the portable communication device 102 and/or the access management engine 118 may provide settings to the computing devices 106-114 and applications 116, in addition to access. Specifically, for example, the user profile for the individual 104, or a group of individuals, may include specific settings, which act to tailor the computing devices 106-114 and/or applications 116 to the individual 104. For example, upon granting access to a location at door 126, which is restricted by the entry door access unit 108, a light at the location may also be turned on for a period of time at a specific (or generic) light intensity and a computing device at the location (e.g., computing device 110, etc.) may be logged into the individual's profile and/or account. Further, an application 116 may be initiated, upon grant of access, with certain data structures linked to the application 116 and/or certain features, tools, or views, available to the individual 104 upon access. It should be appreciated that any number of settings may be associated with access to the computing devices 106-114 and applications 116 herein, which may be specific to the individual 104 and/or a group of individuals, etc., or not.

Figure 2:
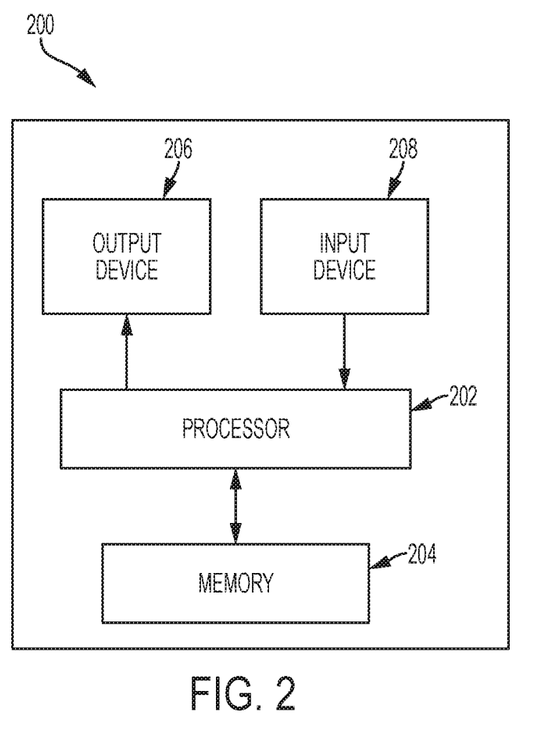
FIG. 2 is a block diagram of an exemplary computing device that may be used in the system of FIG. 1.

FIG. 2 illustrates an exemplary computing device 200 that can be used in the system 100 of FIG. 1. For illustration, the portable communication device 102 and each of the computing devices 106-114, 122 in the system 100 are consistent with computing device 200. However, the system 100 and its components should not be considered to be limited to the computing device 200, as different computing devices and/or arrangements of computing devices may be used. In addition, different components and/or different arrangements of components (other than illustrated in FIG. 2) may be used in other computing devices. Further, in various exemplary embodiments, the computing device 200 (and, thus, one or more of the portable communication device 102 and the computing devices 106-114, 122 in FIG. 1) may include multiple computing devices located in close proximity, or distributed over a geographic region.

As shown in FIG. 2, the computing device 200 generally includes a processor 202, and a memory 204 coupled to (and in communication with) the processor 202. The processor 202 may include, for example (and without limitation), one or more processing units (e.g., in a multi-core configuration, etc.), including a general purpose central processing unit (CPU), a microcontroller, a reduced instruction set computer (RISC) processor, an application specific integrated circuit (ASIC), a programmable logic device (PLD), a gate array, and/or any other circuit or processor capable of the functions described herein. In addition, the processor 202 may be a single core, a multi-core processor, and/or multiple processors distributed within the computing device 200. In various embodiments, the processor 202 and memory 204 are integrated. The above is exemplary only, and is thus not intended to limit in any way the definition and/or meaning of processor.

The memory 204 of computing device 200, as described herein, is one or more devices that enable information, such as executable instructions and/or other data, to be stored and retrieved. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, tapes, hard disks, and/or any other type of volatile or nonvolatile physical or tangible computer-readable storage media. Further, computer-readable storage media may, in some embodiments, be selectively insertable to and/or removable from the computing device 200 to permit access to and/or execution by the processor 202 (although this is not required). As used herein, the memory 204 may be configured to store, without limitation, biometric data relating to individuals (e.g., the individual 104, etc.), secured documents, access credentials and/or identifiers associated with individuals (e.g., the individual 104, etc.) and used to grant access to the computing devices 106-114 and/or program applications 116 (and/or secured locations, secured documents, if present) in FIG. 1, user profiles, other types of data suitable for use as described herein, etc.

In various embodiments, computer-executable instructions may be stored in the memory 204 of the computing device 200 for execution by the processor 202 to cause the processor 202 to perform one or more of the functions described herein, such that the memory 204 is a physical, tangible, and non-transitory computer-readable storage media. It should be appreciated that the memory 204 may include a variety of different memories, each implemented in one or more of the functions or processes described herein.

While not shown, the computing device 200 may also include a power source (e.g., a capacitor, a battery, etc.) to power the processor 202 and/or the memory 204. However, such a power source is not required in all embodiments. For example, in some embodiments, the computing device 200 may not include a power source, and may need to be connected to one of the computing devices 106-114 in FIG. 1, or another device, to provide power (e.g., such as when the computing device 200 is a USB drive, etc.).

With continued reference to FIG. 2, the illustrated computing device 200 also includes an output device 206 and an input device 208, each coupled to (and in communication with) the processor 202.

The output device 206 of the computing device 200 outputs to, for example, the individual 104, one or more of the computing devices 106-114 and/or program applications 116 in the system 100, or another user in the system 100 (e.g., a user of the computing devices 106-114, 122 in FIG. 1, an individual associated with the access management engine 118, etc.) by, for example, transmitting, displaying, audibilizing, and/or otherwise outputting data such as, but not limited to, authentication and authorization data, access data, and/or any other type of data. The display allows various interfaces (e.g., applications, webpages, etc.) to be displayed (and viewed) at the computing device 200 having various information and data therein, etc. In some examples, the portable communication device 102 may cause interfaces to be displayed at a display device of another computing device, including, for example, a server hosting a website having multiple webpages, etc. It should be appreciated that the output device 206 may include a single device, an integrated device configured to provide (or perform) multiple different output functions, or multiple individual devices collected together. With that in mind, the output device 206 may include any suitable output device including, for example, one or more of a speaker, a display (e.g., a cathode ray tube (CRT), a liquid crystal display (LCD), a light-emitting diode (LED) display, an organic LED (OLED) display, an "electronic ink" display, etc.), a transmitter (e.g., a NFC transmitter, a Bluetooth® transmitter, other transmitters or combinations of transmitters, etc.), a transceiver (e.g., a NFC transceiver, a Bluetooth® transceiver, other transceivers or combinations of transceivers, etc.), etc.

The input device 208 of the computing device 200 is coupled to (and is in communication with) the processor 202 and receives input as desired. For example, the input device 208 may receive input from the individual 104, from the portable communication device 102, from one or more of the computing devices 106-114 and/or program applications 116, from another user (as described above in connection with the output device), etc. It should be appreciated that the input device 208 may include a single device, an integrated device configured to provide (or perform) multiple different input functions, or multiple individual devices collected together. For example, the input device 208 may include one or more of a keyboard, a pointing device, a mouse, a stylus, a touch sensitive panel (e.g., a touch pad or a touch screen, etc.), an interface peripheral (e.g., a biometric reader such as a fingerprint scanner, a retina scanner, a voice scanner, etc.), a camera, a receiver, another computing device, an audio input device, a fingerprint reader, etc. In addition, in some implementations, the input device and/or the output device may further include a network interface (e.g., a wired network adapter, a wireless network adapter, a mobile telecommunications adapter, or other device, etc.) so that the computing device 200 is able to communicate with other computing devices (e.g., the computing device 122 associated with the access management engine 118, etc.) via a network (e.g., via network 120 in the system 100, etc.). In some exemplary embodiments, the network interface may also (or alternatively) be incorporated into or with the processor 202.

In some exemplary embodiments, the input device 208 of the computing device 200 may function as both an input device and an output device (and vice versa). For example, a touch screen display, such as that included in a tablet, a smartphone, or similar device, may behave as both an output device and an input device (e.g., as a display and a fingerprint reader, etc.). Similarly, a transmitter and receiver may be combined as a transceiver (broadly, network interface). Or, a display and a biometric reader may be combined, such that biometric data (e.g., fingerprint data, etc.) can be captured by the display. Further, in at least one exemplary embodiment, an output device and/or an input device are omitted from a computing device.

Referring again to FIG. 1, and as previously described, the portable communication device 102 is illustrated as a cellular phone or smartphone. The input device 208 of the cellular phone generally includes a fingerprint scanner, associated with the display (such that the display functions as both the output device 206 and the input device 208 of the cellular phone). The fingerprint scanner, via the display, is configured to receive a sample fingerprint from the individual 104 for use in authenticating the individual 104 (e.g., via interface 400 in FIG. 4, etc.). The processor 202 is then configured to compare the sample fingerprint, from the scanner, to a reference fingerprint previously stored (e.g., recorded, etc.) in memory 204 of the cellular phone. As such, in FIG. 1, the portable communication device 102 locally authenticates, or confirms, the individual 104 using the reference biometric data stored therein. In other embodiments, it should be appreciated that portable communication devices may include fingerprint scanners (or other biometric readers), as input devices, that are separate from the display (and/or, in general, that are separate from output devices of the portable communication devices).

Moreover, the output device 206 of the cellular phone or smartphone in FIG. 1 generally includes the display (as described above) and a transmitter. The display allows various interfaces to be displayed (and viewed) at the smartphone or cellular phone, for example, by the individual 104, having various information and data therein, etc. The transmitter output device 206 is configured to broadcast data (e.g., authentication signals, etc.) to one or more of the computing devices 106-114 and/or the program applications 116 (or the access management engine 118), when the individual 104 is authenticated at the smartphone or cellular phone, as described herein. Also in the system 100 of FIG. 1, each of the computing devices 106-114, 122 generally includes a memory and a processor, consistent with the memory 204 and processor 202 of computing device 200, respectively. In addition, each also generally includes a receiver (broadly, an input device consistent with input device 208 of computing device 200) configured to receive data broadcast (or otherwise transmitted) by the transmitter output device 206 of the cellular phone or smartphone, or by other communication devices (or computing devices) that may be used in the system 100.

Figure 3:
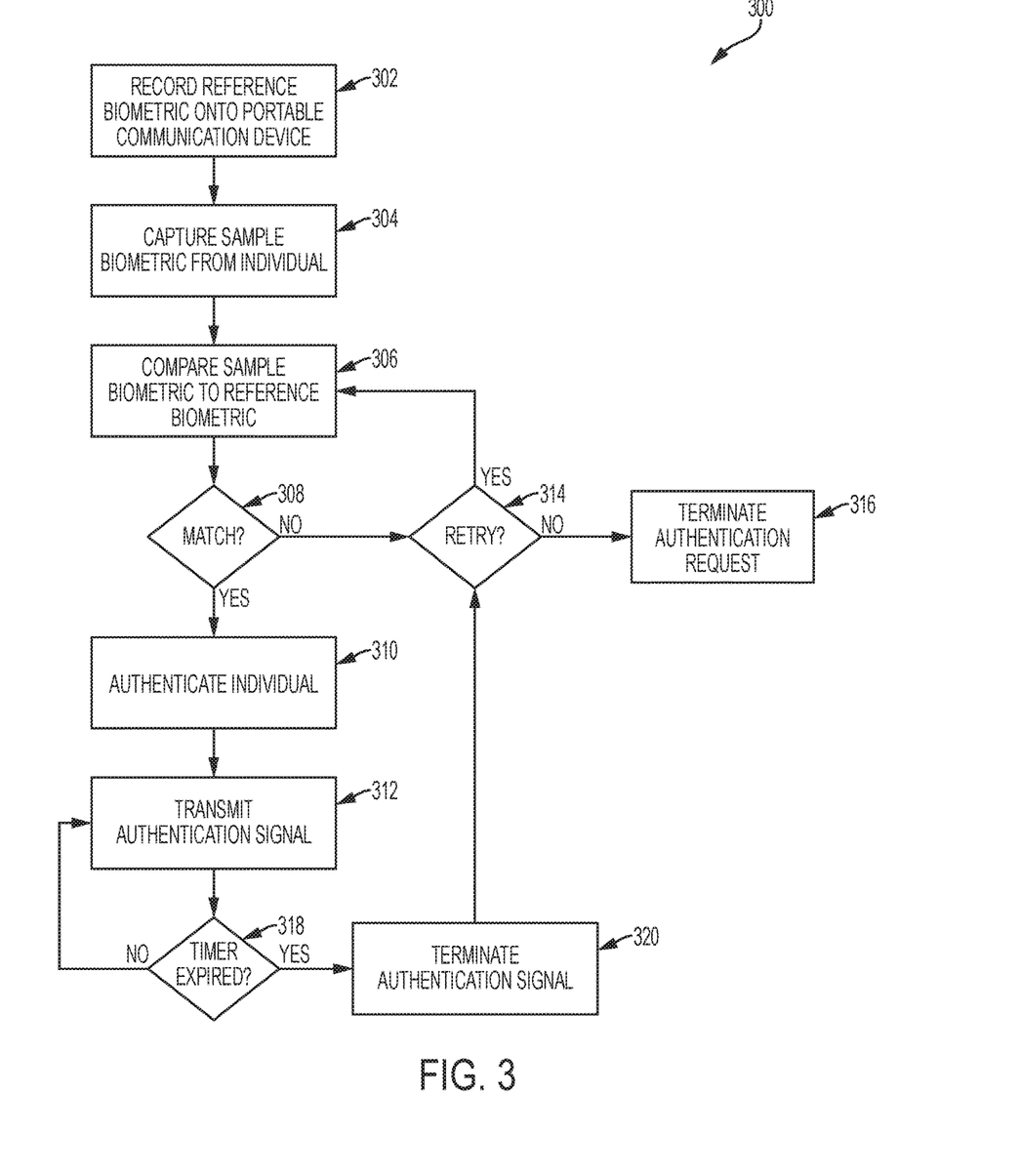
FIG. 3 is an exemplary method, suitable for use with the system of FIG. 1, for authenticating an individual prior to granting a requested access to the individual to a computing device (e.g., prior to logging the user into the computing device, etc.)

FIG. 3 illustrates exemplary method 300 for use in authenticating the individual 104, in connection with the system 100, prior to providing access to the individual 104 to the computing device 106, for example. The exemplary method 300 is described as implemented in the portable communication device 102 of the system 100 (e.g., in the processor 202 of the portable communication device 102, etc.), with further reference to the computing device 106, and access management engine 118. Further, for purposes of illustration, the exemplary method 300 is described herein with reference to the computing device 200. But, the methods herein, including method 300, should not be understood to be limited to the exemplary system 100 or the exemplary computing device 200, just as the systems and computing devices herein should not be understood to be limited to the exemplary method 300.

Generally, the access management engine 118 initially registers the individual 104 for access to the computing device 106, for example. As described in connection with the system 100, this generally includes, among other operations, assigning access credentials to the individual 104 for the computing device 106 (and storing the access credentials in the data structure 124, for example, in a listing of individuals approved to access the computing device 106 and/or in the user profile for the individual 104).

With reference now to FIG. 3, in the method 300, biometric data (e.g., fingerprint data, etc.) from the individual 104 is recorded onto the portable communication device 102, at 302. This may be done at any time, for example, directly at the portable communication device 102 (e.g., using a biometric reader such as a fingerprint scanner associated with the portable communication device 102, etc.), or this may be done by the access management engine 118, for example, when the individual 104 is registered for access to the computing device 106 (e.g., where the recorded biometric may be captured by the access management engine 118 and then transmitted to (and received by) the portable communication device 102, etc.). In either case, the recorded biometric data is stored in memory 204 of the portable communication device 102 as a reference (e.g., as a reference biometric, etc.), for subsequent use as described herein.

When desired, to use the portable communication device 102 and/or to access the computing device 106, the individual 104 presents a biometric to the portable communication device 102, which, in turn, is obtained (or captured) by the portable communication device 102, at 304. For example, the individual 104 may provide the sample biometric to the biometric reader at the portable communication device 102 (e.g., a fingerprint scanner, etc.). The sample biometric is compared, at 306, by the processor 202 of the portable communication device 102 to the reference biometric previously stored on the portable communication device 102 in the memory 204.

If the captured biometric is a match for the reference biometric (e.g., reference fingerprint, etc.) (within applicable standards, for example), at 308, the portable communication device 102 authenticates the individual 104, at 310, and sets an authentication indicator for the individual 104 in the memory 204 of the portable communication device 102. The authentication indicator identifies the authentication and enables transmission (e.g., broadcast, etc.) of an authentication signal by the portable communication device 102 (e.g., via a transmitter of the portable communication device 102, etc.). In this exemplary embodiment, the portable communication device 102 transmits the authentication signal, at 312, to the computing device 106, if in range (e.g., wirelessly broadcast the authentication signal via a Bluetooth® or other transmitter (or transceiver) device, etc.). As described in connection with the system 100, the authentication signal may include any necessary information (e.g., an identifier such as a user name for the individual 104, etc.) to allow access to the computing device 106, for example, directly or through the access management engine 118. The authentication signal may further be broadcast to other computing devices and/or applications (e.g., computing devices 108-112, computing device 114, application 116, etc.), in the vicinity of the portable communication device 102 and/or remote therefrom, based on permissions of the individual 104 or not. The computing device 106 (and/or secured documents therein), in turn, becomes accessible, such that it becomes, for example, logged in, etc. The accessibility may include other responses from the computing device 106, or from other computing devices and/or applications (and/or location, documents, etc.), etc. In one example, the authentication signal is provided (from the portable communication device 102 or the access management engine 118) to the door access unit 108, at 312, and the door 126 is unlocked and/or opened in response to the authentication signal (when the individual 104 has permissions for the door access unit 108 (per the individual's user profile), etc.).

Optionally, additional settings associated with the computing device 106, as defined, for example, in the user profile for the individual 104, etc., may be implemented in the computing device 106, in addition to access to the computing device 106. For example, the access management engine 118 (or the portable communication device 102 or computing device 106, upon access or upon accessing the user profile (including, without limitation, user preferences and context (associated with one or more preferences, or not)) may impose default settings to web-browsers, word processing programs, authentication applications, or user specific settings to the same, etc. For example, the user profile may include screen settings, background image/color, shortcuts, web-browser bookmarks, etc. In another example, where the authentication signal provides access to a room (not shown) (e.g., via door access unit 108, etc.), the room may be illuminated in accordance with the user profile, or in general, when access to the room is provided and/or other aspects of the room may become available and/or controllable (e.g., A/V equipment, climate controls, etc., by the individual 104). In such an example, the light source and/or other aspects of the room may be controllable by the access management engine 118 (or the portable communication device 102 or the door access unit 108, etc.).

Conversely, if the captured biometric does not match the reference biometric stored on the portable communication device 102, at 308, the individual 104 may retry the operation, at 314 (e.g., if desired by the individual 104, if allowed by the portable communication device 102, if a preset number of tries has not been exceeded, etc.). Otherwise, the authentication request is terminated, at 316, and thereafter, access for the individual 104 is declined.

With continued reference to FIG. 3, when the portable communication device 102 transmits the authentication signal at 312, the portable communication device 102 also initiates a timer, which defines an interval during which the signal is active, or transmitted (i.e., the biometric status is set as active). As such, the authentication signal only lasts a short period of time (e.g., 10 seconds, 30 seconds, 1 minute, 5 minutes, 1 hour, etc.) (i.e., a broadcast interval), after which it expires and the biometric status is reset (e.g., for security purposes, etc.). In connection therewith, the portable communication device 102 monitors the timer, at 318, and, when the timer expires (i.e., the broadcast interval expires), terminates transmission of the authentication signal, at 320, thereby resetting the biometric status. The individual 104 can repeat the authentication operation, as desired.

Separately, in various embodiments, the computing devices 106-114 and/or the applications 116, such as, for example, the computing device 106 in the method 300, are able to revoke access consistent with the authentication signal from the portable communication device 102, or based on another time interval controlled by the computing device 106 and/or the access management engine 118, or otherwise. In one example, access to the computing device 106 (granted based on the authentication signal) may be revoked and/or withdrawn based on inactivity at the computing device 106.

Figure 4:
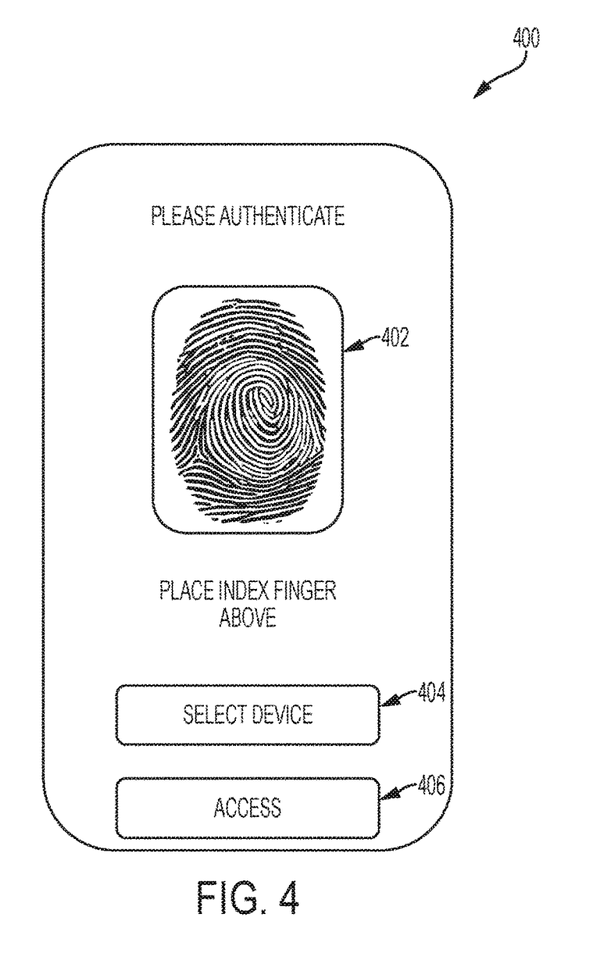
FIG. 4 is an exemplary interface that may be used in connection with the system of FIG. 1 and/or the method of FIG. 3 for capturing biometric data from an individual in connection with determining whether or not to grant a requested access to the individual.

FIG. 4 illustrates an example interface 400 that may be displayed at the portable communication device 102 in connection with obtaining a fingerprint from the individual 104 when authorizing the individual 104. As shown, the interface 400 generally includes a fingerprint scanner 402 (e.g., as part of a display of the portable communication device 102 and enabled by an appropriate application associated with the portable communication device 102, etc.), a button 404 to select a desired device to access (e.g., to select a device with which to pair, from multiple available devices within range of the portable communication device; etc.), and a button 406 to submit (or initiate) an access request when a matching sample fingerprint is provided at the fingerprint scanner 402 (e.g., to transmit an authentication signal, etc.). In some aspects, the interface 400, or portions thereof, may also change color following comparison of the sample fingerprint to the reference fingerprint, for example, to green if the fingerprints match, and to red if the fingerprints do not match.

It should be appreciated that in other embodiments, example interfaces may provide one or more buttons, slides, or other inputs to enable the user to authenticate himself/herself to the portable communication device 102, through face, retina, iris, vein, palm, hand and/or voice recognition, or the like (via the input device 208, including, for example, a camera, a microphone, etc.), etc.

Figure 5:
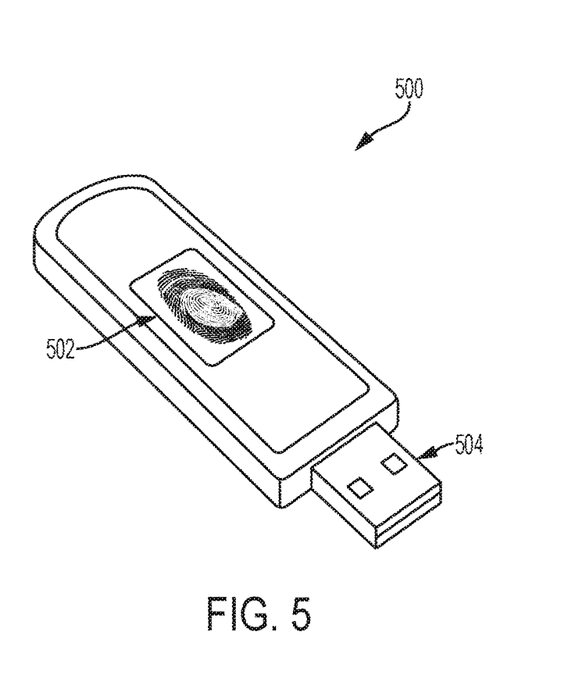
FIG. 5 is an exemplary embodiment of a portable communication device that can be used in connection with the system of FIG. 1 and/or the method of FIG. 3, where the portable communication device is illustrated as a universal serial bus (USB) drive.

FIG. 5 illustrates an exemplary embodiment of a portable communication device suitable for use in the system 100 of FIG. 1 and/or with the method 300 of FIG. 3. In this embodiment, the portable communication device is illustrated as USB drive 500, and includes a fingerprint scanner 502 (broadly, an input device) for use in authenticating individual 104 in connection with accessing one of computing devices 106-114, in FIG. 1. As in the prior descriptions, in this embodiment the fingerprint scanner 502 is configured to receive a sample fingerprint from the individual 104 for use in authenticating the individual 104. A processor 202 of the USB drive 500 is then configured to compare the sample fingerprint, from the scanner 502, to a reference fingerprint previously stored (e.g., recorded, etc.) in memory 204 of the USB drive 500. Then, once the individual is authenticated on the USB drive 500, or before, the USB drive 500 may be physically connected to one of the computing devices 106-114 via USB plug 504. The USB drive 500 can then communicate with (broadly, transmit an authorization signal to) the one of computing devices 106-114, via the connection, so that appropriate access to the computing device can be provided to the individual.

In view of the above, access to multiple different secure computing devices, applications, locations, etc., may be controlled by biometric authentication of an individual at a single computing device. By authenticating the individual and disseminating the authentication to other secure computing devices (or applications, etc.), a need to further authenticate the individual at the other computing devices (or applications, etc.) is omitted, and the access is provided in an efficient manner. Moreover, access to multiple secure computing devices, applications, locations (e.g., door entry devices, etc.), etc., may be provided to an individual by issuing a portable communication device to an individual, and subsequently revoked as desired by confiscating the same portable communication device from the individual. Further, by reducing and/or eliminating duplicative authentication schemes/mechanisms from multiple different devices (or applications), one authentication mechanism (e.g., dual factor biometric authentication, etc.) may be provided that is more robust and/or is beyond the physical capability and/or functionalities of a given device (or application) alone, etc.

Again, and as previously described, it should be appreciated that the functions described herein, in some embodiments, may be described in computer executable instructions stored on a computer readable storage media, and executable by one or more processors. The computer readable media is a non-transitory computer readable storage media. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the operations herein (e.g., in the claims, etc.), for example: (a) storing a reference biometric in memory of a portable communication device; (b) capturing a biometric from a user relating to a desired access; (c) comparing the captured biometric to the reference biometric stored in the memory of the portable communication device; (d) transmitting an authentication signal to at least one computing device, where the authentication signal includes an identifier associated with the user, when the captured biometric matches the reference biometric, to thereby provide the user access to the at least one computing device; (e) setting a biometric status, at the portable communication device, when the captured biometric matches the reference biometric stored in the memory; and (f) resetting the biometric status after a broadcast interval.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature, element or layer is referred to as being "on," "engaged to," "connected to," "coupled to," "included with," "associated with," or "in communication with" another feature, element or layer, it may be directly on, engaged to, connected to, coupled to, associated with, or in communication with the other feature, element or layer, or intervening features, elements or layers may be present. In contrast, when feature, element or layer is referred to as being "directly on," "directly engaged to," "directly connected to," "directly coupled to," "directly associated with," or "directly in communication with" another feature, element or layer, there may be no intervening features, elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements and operations, these elements and operations should not be limited by these terms. These terms may be only used to distinguish one element or operation from another element or operation. Terms such as "first," "second," and other numerical terms when used herein do not imply a sequence or order unless clearly indicated by the context. Thus, a first element operation could be termed a second element or operation without departing from the teachings of the exemplary embodiments.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A portable communication device for use in authenticating a user to provide access to the user to multiple secure items including one or more other devices and/or applications different from the portable communication device, the device comprising:
   a memory configured to store a reference biometric for a user;
   a biometric reader; and
   a processor coupled to the memory and to the biometric reader, the processor configured to:
      compare a biometric of the user, captured at the biometric reader, to the reference biometric stored in the memory; and
      when the captured biometric matches the reference biometric:
         authenticate the user to the portable communication device; and
         transmit an authentication signal to the multiple secure items for a duration of a broadcast interval, the authentication signal including an identifier associated with the user, to thereby provide the user with access to the multiple secure items different from the portable communication device without repeated, separate authentication of the user at the multiple secure items.

2. The portable communication device of claim 1, wherein the identifier includes a username for the user and associated with the multiple secure items; and
   wherein the authentication signal further includes an authentication code.

3. The portable communication device of claim 1, wherein the biometric reader comprises a fingerprint scanner; and
   wherein the memory is configured to store a reference biometric comprising at least one reference fingerprint.

4. The portable communication device of claim 1, wherein the portable communication device includes a smartphone; and
   wherein the processor is configured, in order to transmit the authentication signal, to broadcast, via an output device of the smartphone, the authentication signal within a vicinity of the smartphone for the broadcast interval.

5. The portable communication device of claim 4, wherein the processor is configured to provide the authentication signal to the multiple secure items associated with the smartphone, whereby the user is permitted one or more rights in each of the multiple secure items without providing a further authentication at the multiple secure items.

6. The portable communication device of claim 4, wherein the processor is further configured, in response to a user command, to pair the smartphone with at least one of the multiple secure items, such that when the authentication signal is broadcast, said signal is recognized by the at least one of the multiple secure items.

7. The portable communication device of claim 4, further comprising a near field communication (NFC) transceiver including the output device; and
   wherein the processor is configured to broadcast the authentication signal, by the NFC transceiver.

8. The portable communication device of claim 4, further comprising a Bluetooth® transceiver including the output device; and
   wherein the processor is configured to broadcast the authentication signal, by the Bluetooth® transceiver.

9. The portable communication device of claim 4, further comprising a display including the biometric reader.

10. The portable communication device of claim 1, further comprising at least one of the multiple secure items, the at least one of the multiple secure items being configured to impose at least one user specific setting thereto, based on a user profile associated with the user, upon providing access to the user to the at least one of the multiple secure items.

11. A computer-implemented method for authenticating a user to provide access to the user, the computer-implemented method comprising:
   capturing, at a portable communication device, a biometric from a user relating to a desired access;
   comparing the captured biometric to a reference biometric stored in memory of the portable communication device; and
   transmitting, by the portable communication device, for a duration of a broadcast interval, an authentication signal to multiple computing devices, the authentication signal including an identifier associated with the user, when the captured biometric matches the reference biometric, to thereby provide the user access to the multiple computing devices without repeated, separate authentication of the user at the multiple computing devices, wherein the multiple computing devices are different than the portable communication device.

12. The computer-implemented method of claim 11, wherein capturing the biometric includes scanning a fingerprint, at the portable communication device, via a fingerprint scanner included in the portable communication device.

13. The computer-implemented method of claim 12, wherein the identifier is recognizable by the multiple computing devices, whereby each of the multiple computing devices becomes accessible.

14. The computer-implemented method of claim 11, wherein transmitting the authentication signal includes at least one of:
   wirelessly broadcasting the authentication signal, from the portable communication device, via a network interface of the portable communication device, and
   transmitting the authentication signal, via a physical connection, between the portable communication device and the multiple computing devices.

15. The computer-implemented method of claim 14, wherein the network interface includes one of a near field communication (NFC) transceiver and a Bluetooth® transceiver.

16. The computer-implemented method of claim 11, further comprising storing the reference biometric in the memory of the portable communication device.

17. The computer-implemented method of claim 16, further comprising:
   setting a biometric status, at the portable communication device, when the captured biometric matches the reference biometric stored in the memory; and
   resetting the biometric status after the broadcast interval, the broadcast interval being 30 seconds or more; and
   wherein transmitting the authentication signal includes transmitting the authentication signal only during the broadcast interval.

18. A non-transitory computer readable storage media comprising computer-executable instructions that, when executed by at least one processor, cause the at least one processor to:
   compare a biometric of a user, received at a portable communication device, to at least one reference biometric;
   authenticate the user and permit access, for the user, to at least one of the portable communication device and an application at the portable communication device, when the biometric of the user matches the at least one reference biometric;
   decline access to the user, to at least one of the portable communication device and an application at the portable communication device, when the received biometric does not match the at least one reference biometric; and
   transmit, from the portable communication device, an authentication signal during a duration of at least one interval, to multiple different computing devices, whereby the user is able to access the multiple different computing devices receiving the transmitted authentication signal, without repeated, separate authentication of the user at the multiple different computing devices.

19. The non-transitory computer readable storage media of claim 18, wherein the authentication signal includes an authentication code associated with the user and recognizable by the multiple different computing devices.

20. The non-transitory computer readable storage media of claim 18, wherein the computer-executable instructions, when executed by the at least one processor, further cause the at least one processor to pair the portable communication device to one of the multiple different computing devices, in response to a user command, such that when the authentication signal is transmitted, said signal is recognized by the one of the multiple different computing devices.

\* \* \* \* \*